United States Patent [19]
Jones

[11] Patent Number: 5,475,748
[45] Date of Patent: Dec. 12, 1995

[54] AUTOMATIC TELEPHONE SYSTEM WITH FUNCTION FOR MULTIPLE OUT-DIALED CALLS PER CALLER

[75] Inventor: Scott A. Jones, Prides Crossing, Mass.

[73] Assignee: Boston Technology, Inc., Wakefield, Mass.

[21] Appl. No.: 946,895

[22] Filed: Sep. 18, 1992

[51] Int. Cl.$^6$ ........................................ H04M 3/46
[52] U.S. Cl. ..................... 379/211; 379/210; 379/201
[58] Field of Search .................................. 379/210, 211, 379/92, 91, 51, 57, 201

[56] References Cited

U.S. PATENT DOCUMENTS

| | | | |
|---|---|---|---|
| 4,313,035 | 1/1982 | Jordan et al. | 379/211 X |
| 4,371,752 | 2/1983 | Matthews et al. | 365/29 |
| 4,580,012 | 4/1986 | Matthews et al. | 379/245 |
| 4,581,486 | 4/1986 | Matthews et al. | 379/88 |
| 4,585,906 | 4/1986 | Matthews et al. | 379/88 |
| 4,602,129 | 7/1986 | Matthews et al. | 379/88 |
| 4,674,115 | 6/1987 | Kaleita et al. | 379/201 |
| 4,696,028 | 9/1987 | Morganstein et al. | 379/58 |
| 4,752,951 | 6/1988 | Konneker | 379/211 |
| 4,809,321 | 2/1989 | Morganstein et al. | 379/211 |
| 4,850,012 | 7/1989 | Mehta et al. | 379/157 |
| 4,876,707 | 10/1989 | Hashimoto | 379/57 |
| 4,922,520 | 5/1990 | Bernard et al. | 379/97 X |
| 4,922,526 | 5/1990 | Morganstein et al. | 379/157 |
| 4,926,462 | 5/1990 | Ladd et al. | 379/67 |
| 4,955,047 | 9/1990 | Morganstein et al. | 379/112 |
| 4,989,234 | 1/1991 | Schakowsky | 379/92 |
| 5,020,095 | 5/1991 | Morganstein et al. | 379/67 |
| 5,027,384 | 6/1991 | Morganstein | 379/67 |
| 5,029,196 | 7/1991 | Morganstein | 379/67 |
| 5,029,199 | 7/1991 | Jones et al. | 379/89 |
| 5,109,405 | 4/1992 | Morganstein et al. | 379/89 |
| 5,168,517 | 12/1992 | Waldman | 379/211 |
| 5,206,901 | 4/1993 | Harlow et al. | 379/211 |
| 5,243,645 | 9/1993 | Bissell et al. | 379/211 |
| 5,260,986 | 11/1993 | Pershan | 379/57 |

FOREIGN PATENT DOCUMENTS

| | | |
|---|---|---|
| 0295470 | 12/1988 | European Pat. Off. . |
| 498593 | 8/1992 | European Pat. Off. ............... 379/211 |
| 3240589 | 5/1983 | Germany ............................... 379/210 |
| 3501814 | 7/1985 | Germany . |
| 1109861 | 10/1987 | Japan ...................................... 379/210 |
| 63-86647 | 4/1988 | Japan ...................................... 379/211 |
| 92/22164 | 12/1992 | WIPO . |

OTHER PUBLICATIONS

Patent Abstracts of Japan, vol. 12, No. 414, Nov. 2, 1988 for Japanese Application 63–152258, Jun. 24, 1988.
Hattori et al., "Personal communication–concept and architecture", IEEE International Conference on Communications, vol. 4, Apr. 15, 1990, Atlanta, USA, pp. 1351–1357.
European Search Report, The Hague, Apr. 29, 1994.

*Primary Examiner*—Jeffery A. Hofsass
*Assistant Examiner*—Daniel S. Hunter
*Attorney, Agent, or Firm*—Staas & Halsey

[57] ABSTRACT

Equipment providing information services, whether installed near a central office or provided as part of a PBX includes a search service for generating a number of outdialing operations in an effort to reach a subscriber of the search service for a caller. A plurality of outdialing operations are initiated simultaneously, sequentially, or as sets of calls in a sequence with each set including one or more simultaneously dialed telephone numbers. The numbers called may be extensions on a PBX, phone numbers within any area code, cellular phones, or any other type of number which can be reached by telephone. The caller is kept informed of the success or failure of the outdialing operations and when the subscriber called by the caller is reached, the two are connected and any other outdialing operation is terminated. When all of the outdialing operations for one set of telephone numbers is unsuccessful, the next set in sequence is used in one or more new outdialing operations.

28 Claims, 5 Drawing Sheets

FIG. 1

| PRIORITY | SEQUENCE | PHONE NUMBER | TIME |
|---|---|---|---|
| 1 | 1 | POCKET PHONE | |
| 1 | 2 | OFFICE 1 | |
| 1 | 2 | OFFICE 2 | |
| 1 | 2 | RESIDENCE | |
| 1 | 3 | BREAKFAST RESTAURANT | 07:00-08:00 |
| 1 | 3 | SOCIAL CLUB | 18:00-20:00 |
| 1 | 3 | COUNTRY CLUB | 07:00-19:00 |
| 1 | 4 | RELATIVE | |
| 1 | 5 | VOICE MAILBOX | |

AUTOMATIC TELEPHONE SYSTEM WITH FUNCTION FOR MULTIPLE OUT-DIALED CALLS PER CALLER

BACKGROUND OF THE INVENTION

1. Field of the Invention

The present invention is directed to automated call processing systems and, more particularly, to an automated call processing system for locating a called party.

2. Description of the Related Art

In recent years, new telecommunications capabilities have become available to the public, many of which are commonly termed information services. Thus, the hardware and software which provide these services are called information services systems. Subscribers of information services made available by local or regional telephone companies and owners of some private branch exchanges gain access to e.g., voice store and forward capability (voice mail); automatic call generation for reminders or wake-up calls, etc.; automatic call distribution; automated call screening; and more. Systems such as those disclosed in U.S. Pat. Nos. 4,371,752; 4,580,012; 4,581,486; 4,585,906; and 4,602,129, all assigned to VMX, Inc. (U.S. Pat. No. 4,371,752 was originally assigned to ECS Telecommunications, Inc.) and U.S. Pat. No. 5,029,199 and U.S. patent application Ser. No. 07/594,648 which are assigned to Boston Technology, Inc. enable public telephone companies to provide many of these services. Systems like those disclosed in U.S. Pat. Nos. 4,696,028; 4,809,321; 4,850,012; 4,955,047; 5,020,095; and 5,029,196, all assigned to DYTEL Corp., enable owners of private branch exchanges (PBXs) to obtain many of these features. Additional services continue to be made available and there are many types of services which have yet to be developed.

On the other hand, telecommunications equipment has been developed which aids in contacting an individual. Cellular telephones and other types of radio telephones provide telephone communications via systems installed in automotive vehicles and hand-held units. Pagers enable individuals to be notified that someone needs to talk to them by telephone. However, all of these types of equipment require that a specific piece of equipment be in close proximity to the individual, so that the individual can receive a call or a notification of a call. No device or system functionality currently exists to reach an individual using conventional telephones in a number of locations.

SUMMARY OF THE INVENTION

An object of the invention is to provide an automated search service for dialing several telephone numbers in an effort to reach an individual.

Another object of the present invention is to provide an automated search service for dialing a plurality of telephone numbers simultaneously to reach an individual as quickly as possible.

Yet another object of the present invention is to automatically dial phone numbers in a predefined sequence in an effort to reach an individual.

A further object of the present invention is to provide automated call routing to a subscriber of an information services in which different phone numbers are called depending upon the time of day at which an incoming call is received for the subscriber.

The above objects are obtained by providing a method for operating a telephone call processing system, comprising the steps of: receiving a search indication that an incoming caller requires special handling to reach a called party; initiating a plurality of outdialing operations in a predefined manner to contact the called party; performing each of the outdialing operations by calling a corresponding number and receiving an outdial operation response; terminating each unsuccessful outdialing operation when the called party is unavailable at the corresponding number called by the unsuccessful outdialing operation and when the called party is contacted by a successful outdialing operation; and connecting the incoming caller to the called party contacted by the successful outdialing operation. The outdialing operations may be initiated simultaneously to reach the called party as quickly as possible. Alternatively, the outdialing operations may be performed sequentially; first one phone number is called and if the called party is not reached, then a second number is called. In addition, these alternatives can be combined by calling sets of telephone numbers in a predefined sequence. The manner in which the telephone numbers are called may be modified by time of day or by identification of the caller using, e.g., access codes or voice recognition.

Preferably, the caller is informed of the progress of the outdialing operations. During simultaneous calling of telephone numbers, each outdialing operation which is determined to be unsuccessful in reaching the called party is reported to the caller. When a set of one or more telephone numbers in a sequence has been unsuccessful, the caller is preferably given an opportunity to continue with the next set, if any, or take other action, such as dialing a different person's phone number or extension, leaving a message on voice mail, sending a facsimile or e-mail, etc. During simultaneous outdialing operations, when one of the outdialing operations is successful, the other outdialing operations are terminated. If one of the outdialing operations to be terminated has been connected to a human being, the human being is informed that the called party has been reached prior to terminating the connection.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

The present invention provides a service to subscribers using a telephone network. A preferred embodiment using an integrated services platform to provide the service is described below. However, other ways of providing the service defined by the appended claims will be readily apparent to those of ordinary skill in the art. For example, a computer system having a single processor could be used, either to provide all of the services of the integrated services platform, or to provide solely a service according to the present invention.

Figure 1:
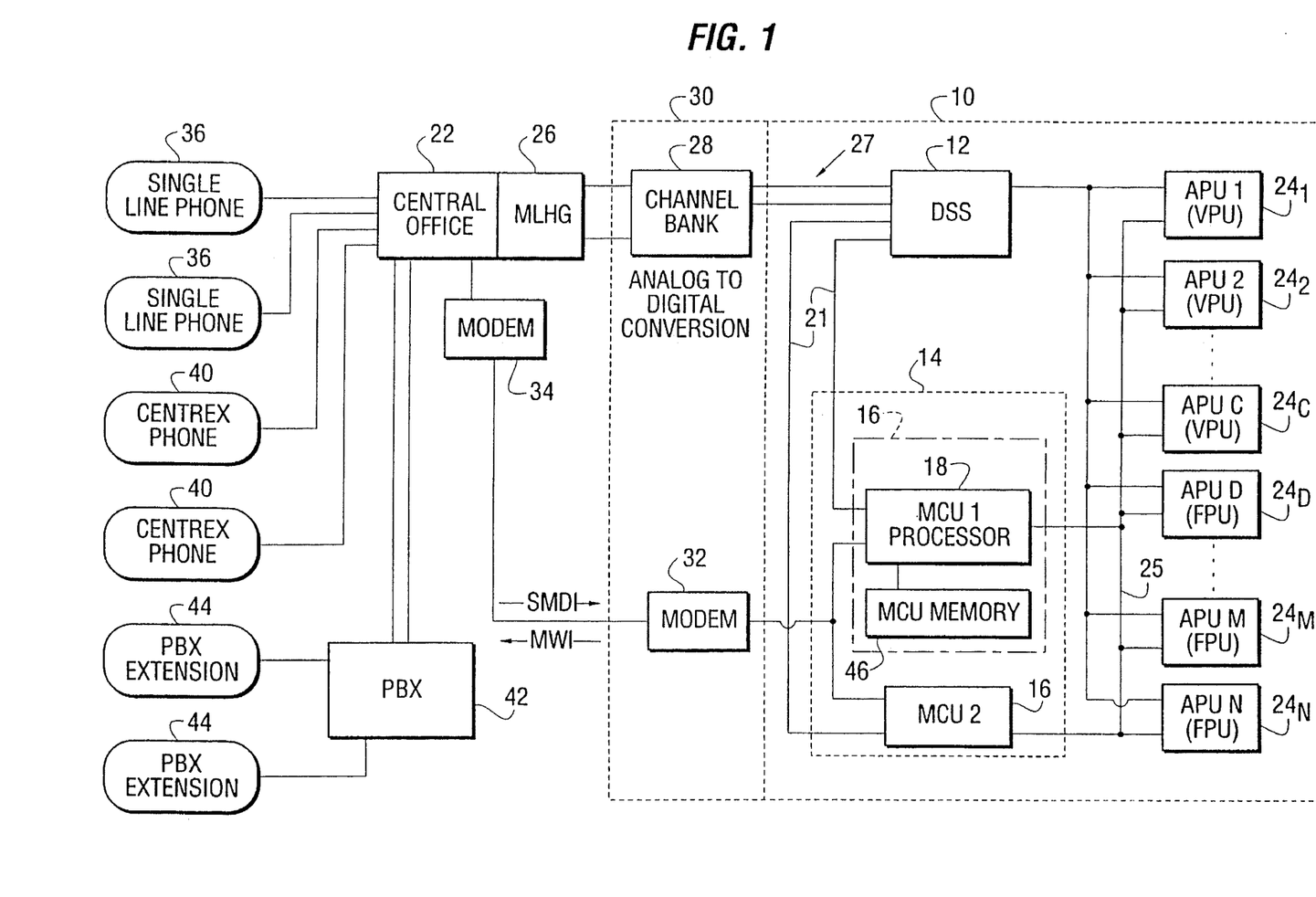
FIG. 1 is a block diagram of a local telephone system including an information services system according to the present invention.

Illustrated in FIG. 1 is a telephone network including an integrated services platform 10, such as the platform disclosed in U.S. Pat. Nos. 5,029,199 and 5,193,100 both incorporated herein by reference. Typical services that are performed by an information services system, such as the platform 10 include voice mail, automated reception services, etc. In the platform described in U.S. Pat. No. 5,029, 199, a digital switch 12 is controlled by control unit 14 which may contain one or more master control units (MCU) 16 each including a MCU processor 18.

The MCUs 16 control operation of the digital switching system 12 via one of the control lines 21 to establish connections with a central office 22. A plurality of application processing units (APUs) 24, connected together and to the MCUs 16 via a communication network 25, such as an ETHERNET, may perform many functions, including speech recognition, speech synthesis, voice mail processing, facsimile processing, e-mail processing, videotext processing, etc. As illustrated in FIG. 1 and described in U.S. patent application Ser. No. 07/594,648, some of the application processing units (APUs) 24 may be limited to providing a single service, such as voice processing units $24_2$–$24_c$ or facsimile processing units $24_D$–$24_M$. Other application processing units, represented by APUs $24_1$ and $24_N$ may provide multiple services which are either used less often, and may provide one or more of voice mail and facsimile processing for responding to fluctuations in demand. If the central office 22 is a digital central office, connection between the central office 22 and the digital switching system 12 may be via a multiple line hunt group (MLHG) 26 and one or more conventional T1 lines 27. However, if the central office is an older analog switch, a channel bank 28 in an analog/digital converter unit 30 is provided between the MLHG 26 and the T1 line(s) 27. During operation, a message packet may be passed from the central office 22 to the control unit 14 via modems 32, 34 using a protocol such as the simplified message desk interface (SMDI). The same link can be used to send a message waiting indication (MWI) to subscribers connected to the central office 22.

The central office 22 may be connected to many different types of phones, including single line phones 36, 38, centrex phones 40 and private branch exchanges, such as PBX 42 with PBX extensions 44.

Each MCU 16 includes a MCU memory 46 in addition to the MCU processor 18, as illustrated for MCU1. The contents of the MCU memory 46 in MCU1 and MCU2 is typically the same, to provide redundancy. To simplify explanation of the present invention, it will be assumed that there is only a single active MCU 16 with a MCU processor 18 and MCU memory 46.

Figure 2:
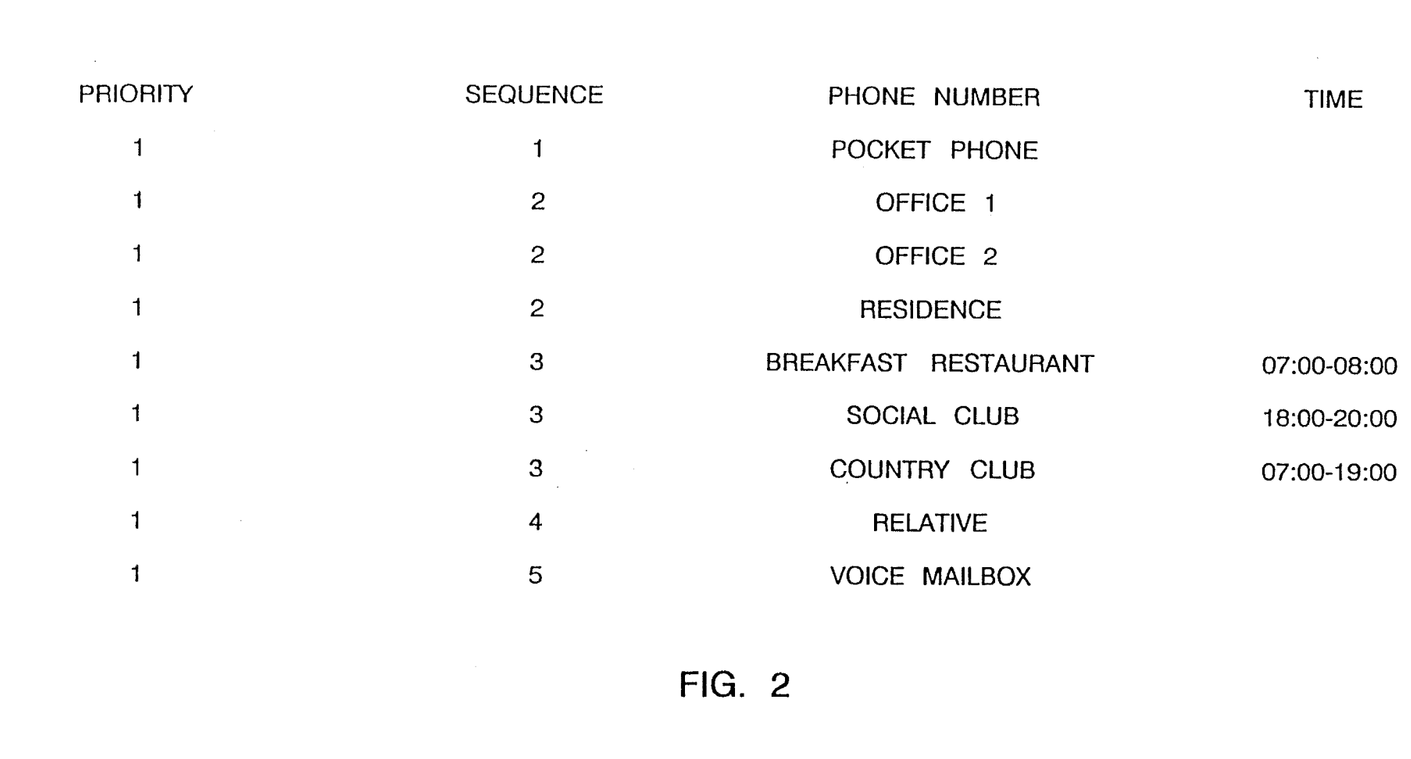
FIG. 2 is a file structure diagram in one embodiment of a phone number search file used by the present invention.

Included in the tasks executed by the MCU 16 are distributing the processing of incoming telephone calls to the APUs 24 and maintaining administration data. Included in the administration data are one or more files defining parameters of a search service according to the present invention. These files may take many forms, one example of which is illustrated in FIG. 2. There may be additional fields beyond those shown in FIG. 2, or a subset of the features of the present invention may be provided while retaining other features of the present invention and thus fewer fields might be included. In addition, the correlation between the fields could be provided by different means, including separate files linked in any conventional way, including using one or more fields which are common among the files.

The present invention is directed to situations in which an individual cannot be reached at an extension and due to urgency or some other reason it is important that the individual be reached by a caller, rather than recording a message, and to situations in which an individual must be reached as quickly as possible and the MCU memory 46 contains more than one telephone number for the individual or "called party". According to the present invention, the processors 18, 24 in the platform 10 are programmed to respond in the situations described above by initiating a plurality of outdialing operations in a predefined manner to contact the called party. The predefined manner may be a specific order determined by the contents of the search file, such as the file illustrated in FIG. 2. In different situations, it may be preferable for the predefined manner to specify performing a number of outdialing operations simultaneously, such as in a case of extreme urgency, or to sequentially try one phone number after another until all phone numbers for an individual have been called. Depending upon the type of people who subscribe to the service, only one of these two types might be provided. However, in the preferred embodiment a search file according to the present invention is structured to provide the flexibility to perform either type of outdialing operation or a combination of the two.

The flexible operation of the preferred embodiment is made possible by storing information like that illustrated in FIG. 2. In the preferred embodiment, phone numbers at which a subscriber can be reached are stored in sets. Each set may have one or more telephone numbers which are recorded in the phone number field. In FIG. 2, textual labels are used, but in a real file, the corresponding digits would be stored in the phone number field. Each of the sets have a predefined sequence as indicated by the sequence field. There are several ways in which multiple phone numbers can be assigned to the same set. One way is to permit several phone numbers to be entered in a single phone number field. Another is to have multiple records with the same sequence number, as illustrated in FIG. 2. An entry in the file having sequence number 1, such as the first line in FIG. 2, will be dialed as soon as the search service is initiated.

In the preferred embodiment, one or more other records are used to indicate when the search service is initiated. Some examples of what may be stored in the record(s) include initiating the search service immediately, or after a phone number dialed by a caller fails to reach the called party and the call is forwarded from a public telephone switch (e.g., using SMDI), or as an option in an automated receptionist service, or any other condition which can be detected. The record(s) may be created in any known way, including using either a computer terminal or an interface using audio output and telephone keypad input. Conventional information services systems typically provide for handling call failures in more than one way, e.g., transfer to another extension, such as the operator, or transfer to a voice mail process which may be executed by an APU 24 when implemented on the platform 10 illustrated in FIG. 1. One way of implementing the present invention is to modify the existing mechanism for handling call failures to check the search service file which may be similar to the file depicted in FIG. 2, when, e.g., there is a "ring no answer" at a called number of a subscriber to the search service. In this situation, a search service according to the present invention may be implemented in an information services system for subscribers who do not subscribe to an automated receptionist or voice mail service.

For individuals who subscribe to both an automated receptionist and a search service according to the present invention, the automated receptionist may provide a menu option or respond to an unannounced access code which permits immediate access to the search service. Another way of providing immediate access to the search service is for a subscriber to have more than one telephone number. One telephone number may be for an office where the subscriber is during the day. The search service might be used if there is no answer at the subscriber's office telephone number. Another telephone number might be the residence of the subscriber. The call failure handling for the subscriber's residential telephone number might only permit leaving a voice mail message, or might permit only trying the office number and then voice mail. A third telephone number of the subscriber might be used to immediately enter into the search service. Since these alternatives merely require modification to the codes used in conventional call failure processing and the addition of computer program(s) to identify the code in the call failure files and access the search service programs or map a telephone number to initiate the search service, details of how this would be accomplished can be easily provided by one of ordinary skill in the art.

In the event that an automated receptionist is used to provide a menu option for access to the search service, some mechanism may be used to identify or classify the caller. For example, when access to the search service is requested, the caller may be prompted for an access code. Alternatively, at this time or previously the caller may be asked to give the name of who is calling. In a conventional manner, this name may be stored as an announcement for when the called party is reached. In addition, the name could be compared with prerecorded names in a form of voice recognition to identify the caller. Other forms of caller identification may be used as known in the art. Using any of these means to identify the caller, the caller may be assigned a priority which is used to reference the priority field in the file illustrated in FIG. 2. For callers assigned different priorities, the system may use different sets of telephone numbers. For example, the system may not route calls from business associates to a subscriber's home, calls from some friends or other acquaintances might be routed to a subscriber's home, but not to an office number, etc. Other priority values might be provided for callers who do not have an access code or are not recognized when their name is given. This priority or another priority might not be permitted to use the search service at all, or at certain times of day by using the time field as described below.

The time field in the file illustrated in FIG. 2 may be used to add an additional restriction to when a phone number in a set is used. As illustrated in FIG. 2, some sets might be active at all times. For example, a number 1 priority call to the subscriber whose file is illustrated in FIG. 2 will result in a single initial phone call to one of the small transportable cellular telephones which this subscriber usually has nearby. If there is no answer, three telephone calls are initiated simultaneously, two of which are to different office phone numbers and the third of which calls the subscriber's residence. The office phone numbers might be the main number and a direct inward dial number for a single office, or two completely different locations for someone who has more than one office. If all three of these calls are unsuccessful in locating the subscriber, then a call is placed to one of three numbers, if the time of day is a time at which the subscriber is likely to be at that location. The first is a restaurant where the subscriber regularly eats breakfast, but no other meals, the second is a club where the subscriber sometimes goes in the evening, and the third is a country club where the subscriber plays golf. If the number(s) called in the third set are unsuccessful or the time of day does not fit any of the three categories, then a relative is called. If this call is also unsuccessful, as a last resort the caller is given the opportunity to leave a voice mail message. The examples given merely provide an indication of the flexibility, including time restrictions which can overlap, e.g., zero, one or two phone calls might be made in set 3.

Figure 3A:
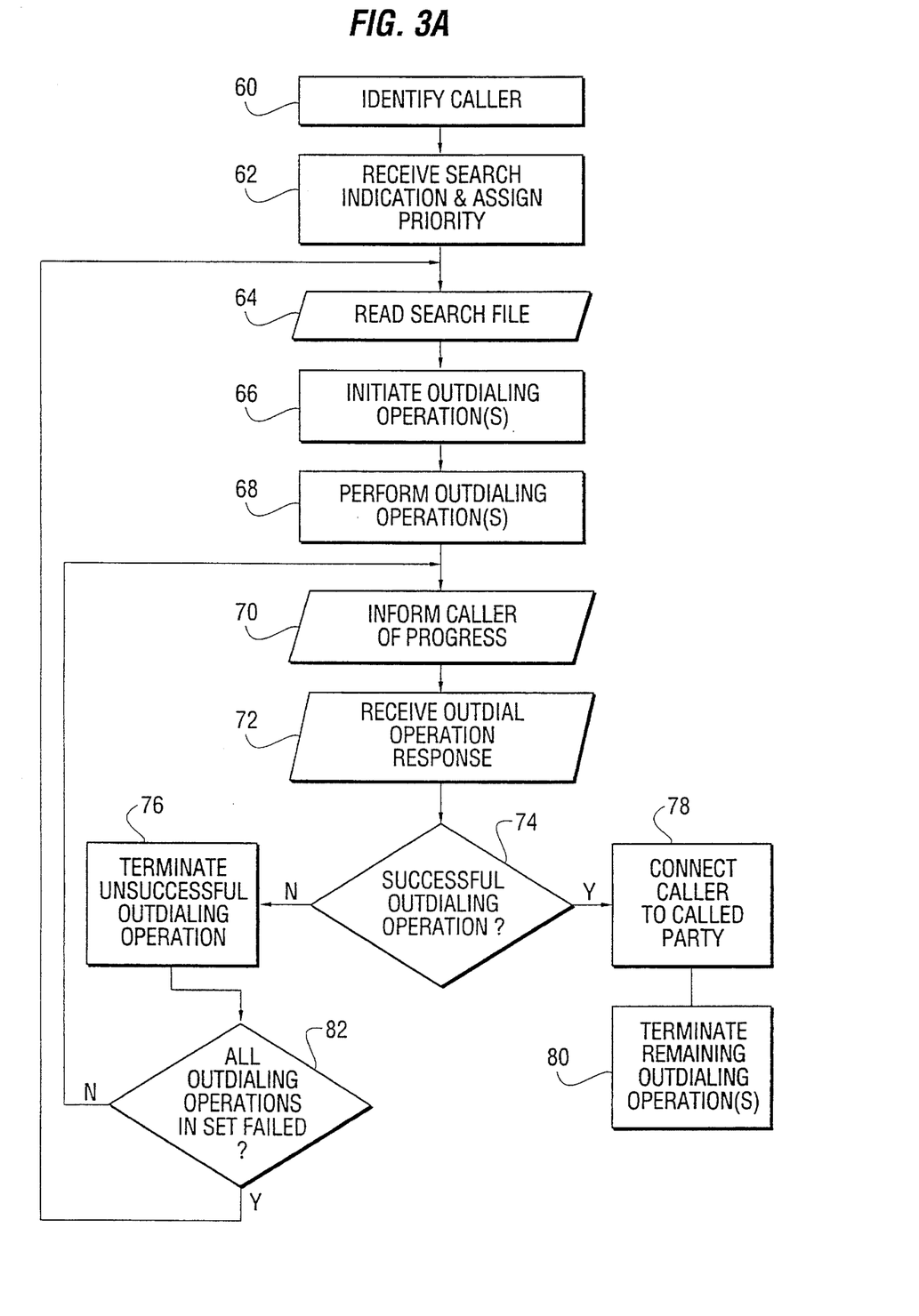
FIGS. 3A–3C are flowcharts of a method according to the present invention.
Figure 3B:
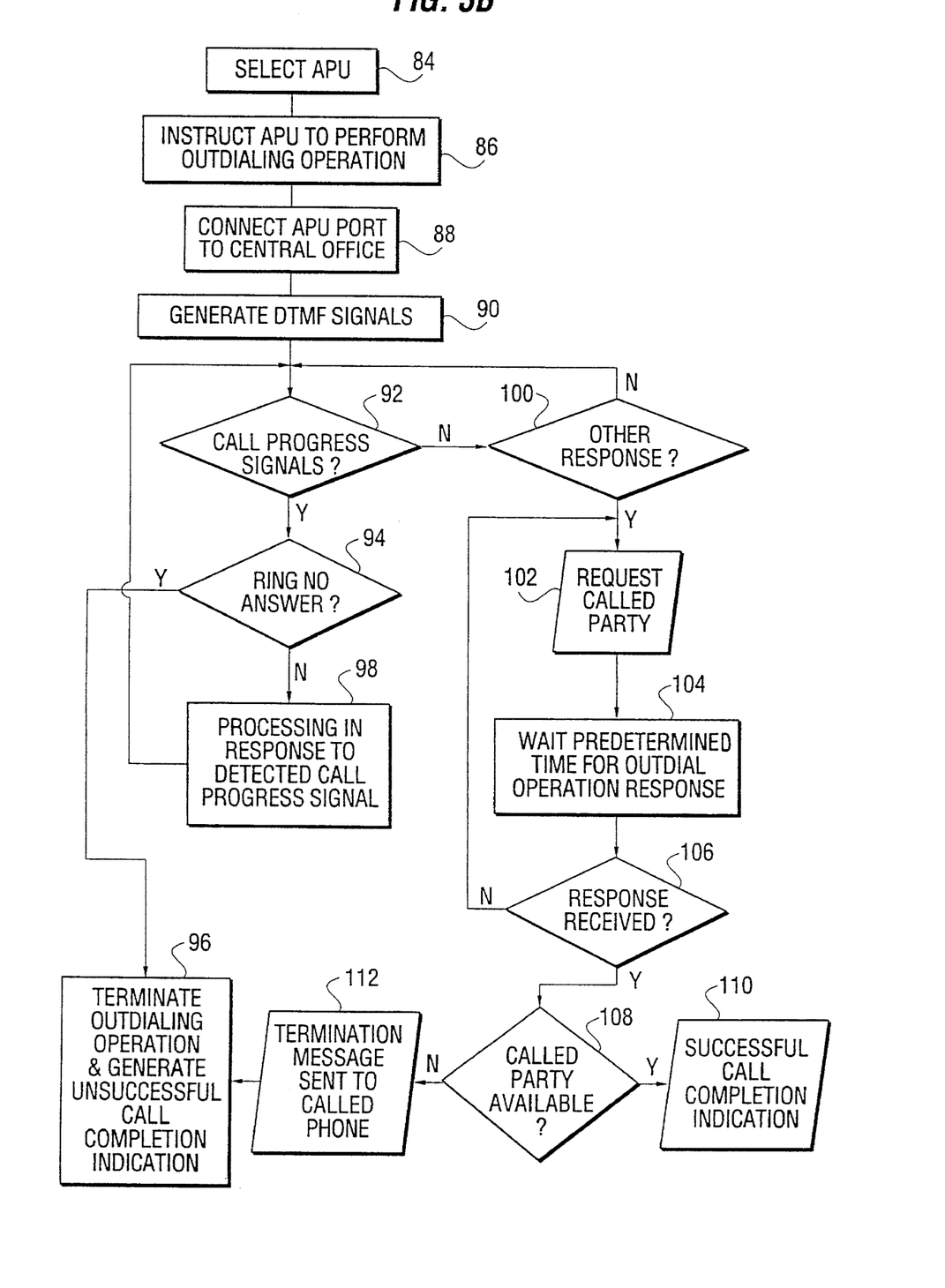
Figure 3C:
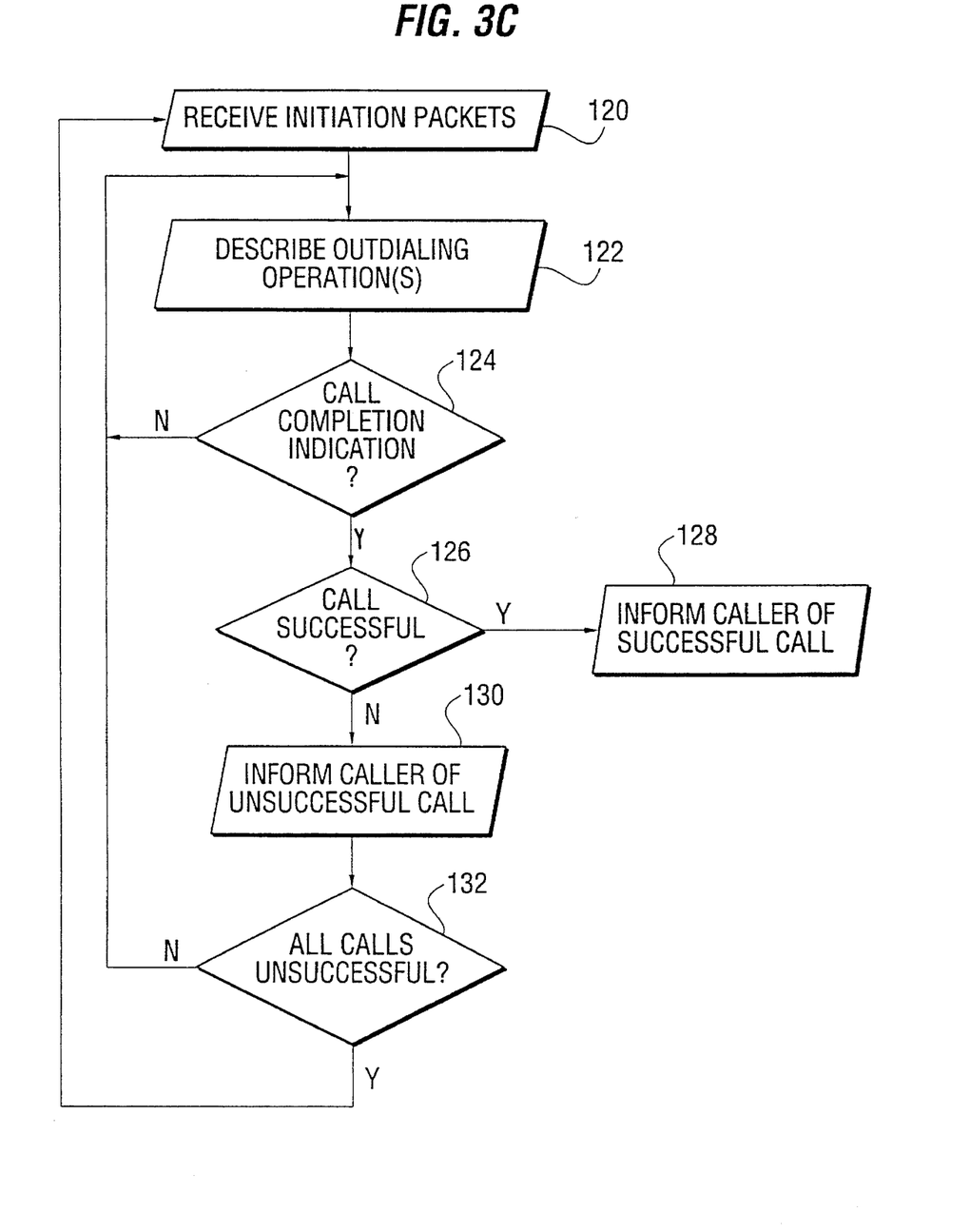

A more detailed description of how search service processing is performed will be provided with reference to FIGS. 3A–3C and to the search file illustrated in FIG. 2. No detailed description will be provided of how the caller enters the search service, since mapping to a process as a result of calling a particular phone number and use of menus by an automated receptionist are well known. Any known method may be used to identify 60 a caller if this option is made available to subscribers. The present invention does not depend upon the caller being identified, since all callers could be treated the same. Similarly, assigning 62 a priority for searching is an option which may or may not be made available to subscribers. Most likely prioritization will only be used if callers are identified. In addition, prioritization might be used only at specified time(s) of day or based on last known location. These options are illustrated to conform to the fields in FIG. 2.

The essential steps of the present invention begin once a search indication is received (as part of step 62) that an incoming caller requires special handling to reach a called party. This search indication is obtained by an incoming call process which may be an automated receptionist or a process which maps telephone numbers to services, or some other process, as discussed above. In response, the MCU 16 reads 64 the search file stored in the MCU memory 46 and initiates 66 one or more outdialing operations, depending upon the number of phone numbers in the first phone number set, i.e., with sequence number 1, which match the circumstances, i.e., the priority of the caller, the time of day and any other restrictions which might be present. For the subscriber whose data is illustrated in FIG. 2, a single outdialing operation would be initiated when the search begins. The outdialing operation(s) are performed 68 as described below with reference to FIG. 3B and preferably the caller is informed 70 of the progress of the outdialing operations as described below with reference to FIG. 3C. The task of informing 70 the caller of progress in performing the outdialing operation(s) may be one of the tasks of the incoming call process or the MCU 16 may initiate a task-on one of the APUs 24 to report on the progress of the outdialing operations.

An outdial operation response is received 72 as a busy signal, ring no answer, or a response by a human being, such as a response to a menu output by the process performing the outdialing operation, as discussed below with respect to FIG. 3B. Based on the outdial operation response a determination is made 74 whether the outdialing operation is successful. If the outdial operation response indicates that the outdialing operation was unsuccessful, that outdialing operation is terminated 76. If it is determined 74 that the outdialing operation was successful, i.e., the outdial operation response indicates that the called party is at the phone number called by that outdialing operation, the MCU 16 controls the DSS 12 to connect 78 the incoming call to the telephone called by the successful outdialing operation. All remaining outdialing operations will necessarily be unsuccessful and therefore they are terminated 80 after sending an appropriate message, such as stating that the called party has been found elsewhere. In the future, central offices may have the capability, e.g., using "SS7", to make the connection between the caller and the called party. If so, the MCU 16 or the APUs 24 connected to the caller and the called party will generate the signals necessary to cause the central office 22 to make the connection.

Until a successful outdialing operation is detected, after each termination of an unsuccessful outdialing operation, a determination is made 82 as to whether all outdialing operations in a set have been found to be unsuccessful, e.g., after a predetermined amount of time has been spent calling a specific number. If at least one outdialing operation in the current set continues to be performed, the MCU 16 waits until another outdial operation response is received 72. When all outdialing operations in a set are determined 82 to be unsuccessful, the search file is read 64 for another set. If another set exists for the called party, steps 66–74 are repeated and steps 76–82 are performed as appropriate depending upon the outdial operation response(s). In the case of the file depicted in FIG. 2, in the first set only a single outdialing operation will be initiated 66 and if determined 74 to be unsuccessful, after reading 64 the second set, three outdialing operations will be initiated 66. This may be accomplished by having three different APUs 24 each execute a process which performs an outdialing operation, or each of the three outdialing operations could be assigned to one of the ports on the same APU 24, or in general any combination of APUs 24 executing one or more processes could be used.

As each outdialing operation is initiated, the steps illustrated in FIG. 3B are performed. The MCU 16 selects 84 an APU 24 based on even distribution of load on the APUs 24. The selected APU, e.g., APU 24₁, is instructed 86 to perform an outdialing operation by transmitting a message packet from the MCU 16 to the selected APU 24₁ via the bus 25. The message packet will include an instruction code which the APUs 24 have been programmed to interpret as requiring initiation of an outdialing process and will also include the phone number from the search file in the MCU memory 46. The MCU 16 controls the DSS 12 to connect 88 a port of the APU 24₁ to the central office 22 so that the APU 24₁ can generate 90 dual tone multifrequency (DTMF) signals to dial the phone number included in the message packet.

After the number has been "dialed" 90, a test is made 92 to determine whether call progress signals are received. If a "ring no answer" was received 94, i.e., a predetermined number of rings are detected by the outdial operation process and no other sounds are received indicating a response, the outdialing operation is terminated 96 and a call completion indication is provided via the bus 25 to the MCU 16 and to the process reporting on progress of the outdialing operations to the caller indicating that connection was made to the telephone number, but there was no answer. If a "ring no answer" has not been detected 94, appropriate action is taken 98 in response to the call progress signal which was detected. For example, if a busy signal is received, the call may be terminated and then repeated every 30 seconds or one minute for a predetermined period of time. In any event, the type of call progress signal received is reported in a call completion indication that is transmitted to the MCU 16 and to the process reporting on the outdialing operations to the caller.

If it is determined 100 that some other response has been received, a predefined message is generated 102 to request the called party using conventional voice synthesis (or a stored voice message) and menu generation techniques. For example a message of the type "Hello, I have an important phone call for John Doe; please indicate if John Doe is there by pressing 1, if John Doe is not there by pressing 2, if you want me to wait while you check to see if John Doe is there by pressing 3 and if you want to hear the options again by pressing 9." The process waits 104 until a predetermined period of time passes or a response is received. Speaker independent voice recognition could be used to try to determine what response, if any, is received, e.g., "Yes" or "No" in response to a query of whether the called party is present. The request 102 is repeated if no response is received. When it is determined 106 that an outdial operation response was received or the message has been repeated a predetermined number of times, a determination is made 108 as to whether the called party is available.

If the called party is available, a successful call completion indication is generated 110 and output on bus 25 to the MCU 16 and to the process communicating with the caller. Then, the MCU 16 connects 78 the caller to the called party and generates message packets to the outdialing operation processes to terminate 80 all remaining outdialing operations. If the outdial operation response indicates that the called party is unavailable, a termination message, such as "Thank you for your assistance in reaching John Doe" is generated 112. Then the call is terminated 96 and an unsuccessful call completion indication is generated. In FIG. 3B, the termination process after step 112 is illustrated as being the same as after step 94, but they may be different. For example, the unsuccessful call completion indication after step 112 may be specific enough to indicate that a person was reached at the number, but the called party was unavailable. This information could be passed on to the caller by the process monitoring the outdialing operations as described below with respect to FIG. 3C.

There are many ways in which the caller could be kept informed of the progress of the outdialing operations. One of the simplest is to generate a message every few seconds along the lines of "An effort is being made to contact John Doe." Near the other extreme, at least when only one phone is being dialed at a time, the signals received by the outdialing operation process could be supplied to the caller so that the caller could hear how the operation is proceeding. An intermediate example is illustrated in FIG. 3C. It is assumed that a process has been initiated and is maintaining connection to the caller. As noted above, this process may be one task within the incoming call process, or may be a separate process initiated by the MCU 16 prior to initiating the outdialing operations. For example, this process might execute on APU 24ₙ.

When the outdialing operations are initiated by the MCU 16, the monitoring process will receive 120 one or more initiation packets which may be the same packet(s) used to initiate the outdialing operations and are used by monitoring process to provide information regarding the number of phone calls that are being dialed. Alternatively, the packets may provide information, such as the text labels in the phone number field illustrated in FIG. 2. In the latter case, an additional field containing the label identifying the type of phone number would be required and would likely be stored as a digitally recorded voice message by the subscriber.

Using the information received 120 in the initiation packets, the monitoring process may describe 122 the outdialing operation to the caller. If there are no separate packets supplied to the monitoring process, the message might be as simple as, "One phone number is being dialed in an effort to reach John Doe" or, "Three phone numbers are being dialed in an effort to reach John Doe." After generating the message describing 122 the outdialing operation(s), the monitoring process determines 124 whether a call completion indication has been produced by any outdialing operation. If not, the previous message or a similar message may be generated 122 again. When a call completion indication is received, the call completion indication is tested 126 to determine whether the call was completed successfully. As noted above, in the event of a successful call completion indication, the caller is informed 128 and then the MCU 16 connects 78 the caller to the call party. If the outdialing operation is determined 126 to be unsuccessful, the caller will be informed 130. The message produced 130 might simply state that "John Doe was not at one of the phone numbers" or a more elaborate message might be provided, such as "There was no answer on John Doe's pocket phone." After generating 130 the unsuccessful call completion message, the monitoring process determines 132 whether all dialing operations for a set have been completed. If not, the monitoring process returns to describing 122 the remaining outdialing operation(s) and checking 124 for additional call completion indications. If a set is complete, either another set of initiation packets will be received 120, or the monitoring process will receive an instruction from the MCU 16 to terminate execution. In the example illustrated in FIG. 2, a final phone number which is called is the voice mailbox for the called party and the MCU 16 will terminate the monitoring process when a voice mail process begins communication with the caller. Alternatively, the monitoring process could directly hand over the caller to a voice mail process which accesses the same port.

The many features and advantages of the present invention are apparent from the detailed specification and thus it is intended by the appended claims to cover all such features and advantages of the system which fall within the true spirit and scope of the invention. Further, since numerous modifications and changes will readily occur to those skilled in the art from the disclosure of the invention, it is not desired to limit the invention to the exact construction and operation illustrated and described. Accordingly, suitable modifications and equivalents may be resorted to, as falling within the scope and spirit of the invention.

What is claimed is:

1. A method of operating a telephone call processing system, comprising the steps of:
    (a) receiving a search indication that an incoming caller requires special handling to reach a called party;
    (b) initiating a plurality of outdialing operations to contact the called party by sequentially calling a plurality of phone number sets, each set including a plurality of phone numbers for outdialing simultaneously;
    (c) performing each of the outdialing operations by calling a corresponding number and receiving an outdial operation response;
    (d) terminating each unsuccessful outdialing operation when the called party is unavailable at the corresponding number called by the unsuccessful outdialing operation and when the called party is contacted by a successful outdialing operation; and
    (e) connecting the incoming caller to the called party contacted by the successful outdialing operation.

2. A method as recited in claim 1, wherein said performing in step (c) comprises the steps of:
    (c1) simultaneously outdialing each phone number in a first phone number set;
    (c2) determining that said outdialing in step (c1) is unsuccessful for each phone number after a predetermined number of rings without answer and also when other predefined unsuccessful call progress indications are received;
    (c3) generating a first predefined message with a request for the outdial operation response indicating availability of the called party when an answer indication is received at the phone number outdialed in step (c1);
    (c4) receiving the outdial operation response requested in step (c3); and
    (c5) generating a call completion indication for the telephone call processing system in dependence upon said determining in step (c2) and the outdial operation response received in step (c3).

3. A method as recited in claim 2, wherein said terminating in step (d) comprises the steps of:
    (d1) generating a second predefined message when the response received in step (c3) indicates that the called party is unavailable at the phone number outdialed in step (c1);
    (d2) generating a third predefined message when the call completion indication from another outdialing operation indicates successful contact with the called party; and
    (d3) breaking connection with the phone number outdialed in step (c1) after either of steps (d1) and (d2).

4. A method as recited in claim 2, wherein step (c) further comprises the steps of:
    (c6) outdialing each phone number in a second phone number set when the call completion indication for all phone numbers outdialed in step (c1) indicates that said outdialing was unsuccessful at reaching the called party, said outdialing in step (c6) performed simultaneously when more than one phone number is in the second phone number set; and
    (c7) repeating steps (c2)–(c5) for said outdialing in step (c6).

5. A method as recited in claim 4, wherein step (c) further comprises step (c8) repeating steps (c6) and (c7) for each additional phone number set, one phone number set at a time.

6. A method as recited in claim 5, wherein the phone numbers in each phone number set may have varying numbers of digits and other call processing codes, with as few as one digit.

7. A method of operating an information services system processing incoming calls for subscribers of the information services system, said method comprising the steps of:
    (a) storing records defining a plurality of phone number sets for each subscriber of a search service, each phone number set including a plurality of telephone numbers and having a sequence number associated therewith;
    (b) executing an incoming call process to identify and respond to incoming calls requiring the search service;
    (c) initiating a plurality of outdialing operations when said executing in step (b) identifies an incoming call for a search service subscriber requiring the search service;
    (d) executing the outdialing operations initiated in step (c) by simultaneously outdialing each of the telephone numbers in one phone number set at a time, in an order determined by the sequence number associated therewith; and
    (e) connecting the incoming call to the search service subscriber when located by a successful outdialing operation.

8. A method as recited in claim 7, further comprising the step of (f) storing records defining criteria for invoking the search service to provide immediate use of the search service for a first subscriber and use of the search service only if the incoming call is initially unsuccessful for a second subscriber.

9. A method as recited in claim 7, wherein said executing in step (b) comprises the steps of:
   (b1) identifying the incoming call requiring the search service; and
   (b2) reporting results of said executing in step (d) to the caller making the incoming call requiring the search service.

10. A method as recited in claim 9, wherein said executing in step (b) further comprises the steps of:
    (b3) providing a menu of options to the caller after said reporting in step (b2);
    (b4) receiving a response from the caller to the menu provided in step (b3); and
    (b5) interrupting said executing in step (d) in dependence upon said receiving in step (b4).

11. An information services system processing incoming calls for subscribers of information services provided by said information services system, comprising:
    memory means for storing records defining a plurality of phone number sets for each subscriber of a search service, each phone number set including a plurality of telephone numbers and having a sequence number associated therewith;
    processing means for executing an incoming call process to identify incoming calls requiring the search service, for initiating a plurality of outdialing operations when an incoming call requiring the search service is identified and for executing the outdialing operations by simultaneously outdialing each of the telephone numbers in one phone number set at a time, in an order determined by the sequence number associated therewith; and
    switch control means for controlling connection of the incoming call to a search service subscriber when located by a successful outdialing operation.

12. An information services system as recited in claim 11, further comprising switch means, for connecting the incoming call to the search service subscriber in response to said switch control means.

13. An information services system as recited in claim 11, wherein said switch control means signals a switch outside the information services system to connect the incoming call to the search service subscriber.

14. An information services system processing incoming calls for subscribers of information services provided by said information services system, comprising:
    a random access memory for storing records defining a plurality of phone number sets for each subscriber of a search service, each phone number set including a plurality of telephone numbers and having a sequence number associated therewith;
    a first application processing unit for executing an incoming call process to identify incoming calls requiring the search service;
    at least one master control processor, operatively connected to said random access memory and said first application processing unit, to initiate a plurality of outdialing operations when said first application processing unit identifies an incoming call for a search service subscriber requiring the search service;
    at least one second application processing unit, operatively connected to said master control processor and said first application processing unit, to execute the outdialing operations initiated by said master control unit by simultaneously outdialing each of the telephone numbers in one phone number set at a time, in an order determined by the sequence number associated therewith; and
    a digital switching system, operatively connected to said first and second application processing units and said master control processor, controlled by said master control unit to connect the incoming call to the search service subscriber when located by a successful outdialing operation.

15. A method of operating a telephone call processing system, comprising the steps of:
    (a) receiving a search indication that an incoming caller requires special handling to reach a called party;
    (b) initiating a plurality of outdialing operations in a predefined manner to contact the called party by initiating calls to at least two phone number sets with at least one of the phone number sets having a plurality of phone numbers for outdialing simultaneously, the phone number sets being processed sequentially;
    (c) performing each of the outdialing operations by calling a corresponding number and receiving an outdial operation response;
    (d) terminating each unsuccessful outdialing operation when the called party is unavailable at the corresponding number called by the unsuccessful outdialing operation and when the called party is contacted by a successful outdialing operation, all of the outdialing operations in a preceding set being terminated in step (d) before any the outdialing operations in a subsequent set are initiated in step (b); and
    (e) connecting the incoming caller to the called party contacted by the successful outdialing operation.

16. A method as recited in claim 15, wherein said performing in step (c) comprises the steps of:
    (c1) outdialing each phone number in a first phone number set, said outdialing performed simultaneously when more than one phone number is in the first phone number set;
    (c2) determining that said outdialing in step (c1) is unsuccessful for each phone number after a predetermined number of rings without answer and also when other predefined unsuccessful call progress indications are received;
    (c3) generating a first predefined message with a request for the outdial operation response indicating availability of the called party when an answer indication is received at the phone number outdialed in step (c1);
    (c4) receiving the outdial operation response requested in step (c3); and
    (c5) generating a call completion indication for the telephone call processing system in dependence upon said determining in step (c2) and the outdial operation response received in step (c3).

17. A method as recited in claim 16, wherein said terminating in step (d) comprises the steps of:
    (d1) generating a second predefined message when the response received in step (c3) indicates that the called party is unavailable at the phone number outdialed in step (c1);
    (d2) generating a third predefined message when the call completion indication from another outdialing operation indicates successful contact with the called party; and (d3) breaking connection with the phone number outdialed in step (c1) after either of steps (d1) and (d2).

18. A method as recited in claim 16, wherein step (c) further comprises the steps of:

(c6) outdialing each phone number in a second phone number set when the call completion indication for all phone numbers outdialed in step (c1) indicates that said outdialing was unsuccessful at reaching the called party, said outdialing in step (c6) performed simultaneously when more than one phone number is in the second phone number set; and (c7) repeating steps (c2)–(c5) for said outdialing in step (c6).

19. A method as recited in claim 18, wherein step (c) further comprises step (c8) repeating steps (c6) and (c7) for each additional phone number set, one phone number set at a time.

20. A method as recited in claim 19, wherein the phone numbers in each phone number set may have varying numbers of digits and other call processing codes, with as few as one digit.

21. A method of operating an information services system processing incoming calls for subscribers of the information services system, said method comprising the steps of:

(a) storing records defining for each subscriber of a search service at least two phone number sets having sequence numbers associated therewith, at least one of the phone number sets including at least two telephone numbers;

(b) executing an incoming call process to identify and respond to incoming calls requiring the search service;

(c) initiating a plurality of outdialing operations when said executing in step (b) identifies an incoming call for a search service subscriber requiring the search service;

(d) executing the outdialing operations initiated in step (c) by simultaneously outdialing each telephone number in one phone number set at a time, in an order determined by the sequence number associated therewith; and (e) connecting the incoming call to the search service subscriber when located by a successful outdialing operation.

22. A method as recited in claim 21, further comprising the step of (f) storing records defining criteria for invoking the search service to provide immediate use of the search service for a first subscriber and use of the search service only if the incoming call is initially unsuccessful for a second subscriber.

23. A method as recited in claim 21, wherein said executing in step (b) comprises the steps of:

(b1) identifying the incoming call requiring the search service; and (b2) reporting results of said executing in step (d) to the caller making the incoming call requiring the search service.

24. A method as recited in claim 23, wherein said executing in step (b) further comprises the steps of:

(b3) providing a menu of options to the caller after said reporting in step (b2);

(b4) receiving a response from the caller to the menu provided in step (b3); and (b5) interrupting said executing in step (d) in dependence upon said receiving in step (b4).

25. An information services system processing incoming calls for subscribers of information services provided by said information services system, comprising:

memory means for storing records defining at least two phone number sets for each subscriber of a search service, each phone number set having a sequence number associated therewith and at least one of the phone number sets having a plurality of phone numbers for outdialing simultaneously;

processing means for executing an incoming call process to identify incoming calls requiring the search service, for initiating outdialing operations when an incoming call requiring the search service is identified and for executing the outdialing operations by outdialing the at least two phone number sets, one phone number set at a time, in an order determined by the sequence number associated therewith, including simultaneously outdialing the plurality of phone numbers in the at least one of the phone number sets; and switch control means for controlling connection of the incoming call to a search service subscriber when located by a successful outdialing operation.

26. An information services system as recited in claim 25, further comprising switch means, for connecting the incoming call to the search service subscriber in response to said switch control means.

27. An information services system as recited in claim 25, wherein said switch control means signals a switch outside the information services system to connect the incoming call to the search service subscriber.

28. An information services system processing incoming calls for subscribers of information services provided by said information services system, comprising:

a random access memory for storing records defining at least two phone number sets for each subscriber of a search service, each phone number set having a sequence number associated therewith and at least one of the phone number sets having a plurality of phone numbers for outdialing simultaneously;

a first application processing unit for executing an incoming call process to identify incoming calls requiring the search service;

at least one master control processor, operatively connected to said random access memory and said first application processing unit, to initiate outdialing operations when said first application processing unit identifies an incoming call for a search service subscriber requiring the search service;

at least one second application processing unit, operatively connected to said master control processor and said first application processing unit, to execute the outdialing operations initiated by said master control unit by outdialing the at least two phone number sets, one phone number set at a time, in an order determined by the sequence number associated therewith, including simultaneously outdialing the plurality of phone numbers in the at least one of the phone number sets; and a digital switching system, operatively connected to said first and second application processing units and said master control processor, controlled by said master control unit to connect the incoming call to the search service subscriber when located by a successful outdialing operation.

\* \* \* \* \*